US005315475A

United States Patent [19]

Scheidel et al.

[11] Patent Number: 5,315,475

[45] Date of Patent: May 24, 1994

[54] ELECTRICIAN'S FREE POWER CORD

[76] Inventors: Allen T. Scheidel, 31 Briarwood Rd., North Canton, Conn. 06059; Glenn C. Fuller, 37 Jackson St., Torrington, Conn. 06790

[21] Appl. No.: 53,676

[22] Filed: Jul. 26, 1993

[51] Int. Cl.[5] ........ H02B 1/10

[52] U.S. Cl. ........ 361/643; 200/51 R; 307/150; 361/42; 361/601; 361/625

[58] Field of Search ........ 200/51 R; 307/147, 149, 307/150; 174/58, 78, 70 R, 70 B; 439/535, 536; 361/42, 62, 114, 601, 622, 625, 641, 643, 657, 658

[56] References Cited

U.S. PATENT DOCUMENTS

| | | | |
|---|---|---|---|
| 2,636,096 | 4/1953 | Di Blasi | 200/51 R |
| 2,988,617 | 6/1961 | Graziosi | 200/51 R |
| 3,663,864 | 5/1972 | Carlson | 200/51 R |
| 3,922,586 | 11/1975 | Buxton | 361/643 |
| 4,275,374 | 6/1981 | Chaucer | 337/197 |
| 4,567,456 | 1/1986 | Legatti | 335/20 |
| 4,930,047 | 5/1990 | Peterson | 361/641 |
| 5,109,316 | 4/1992 | Murphy | 361/357 |
| 5,212,624 | 5/1983 | Johnson | 361/643 |

*Primary Examiner*—Gerald P. Tolin
*Attorney, Agent, or Firm*—Allen T. Scheidel; Glenn C. Fuller

[57] ABSTRACT

A power cord for use by electricians to supply power to the construction area while normal electrical power has been disconnected. The present invention allows the electrician to draw power from severed power lines without the necessity of removing the insulation from the severed power lines. The power cord provides unmetered power to ground fault current interrupter and circuit breaker protected outlets.

2 Claims, 2 Drawing Sheets

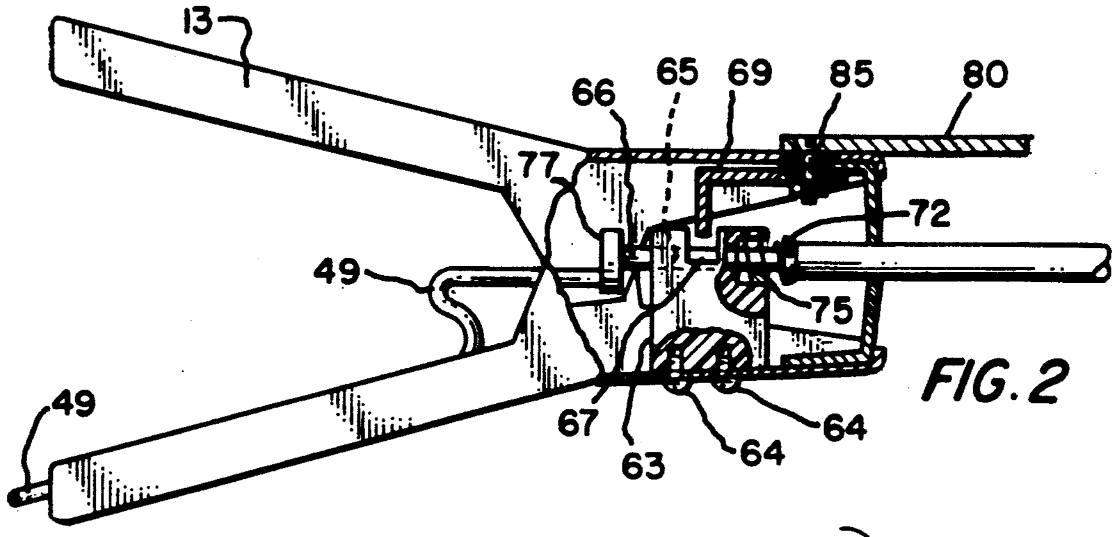
FIG. 2
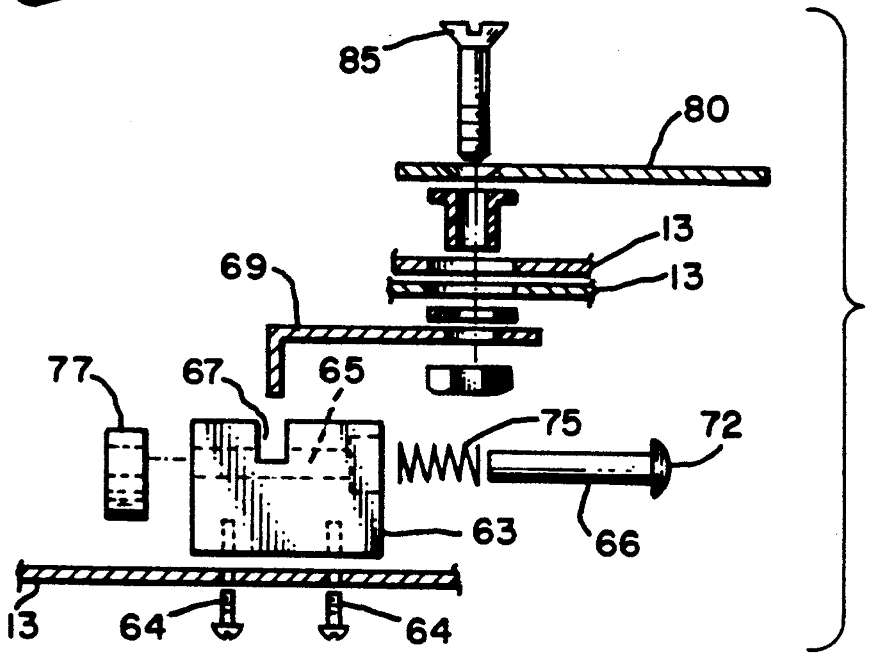
FIG. 3
FIG. 4
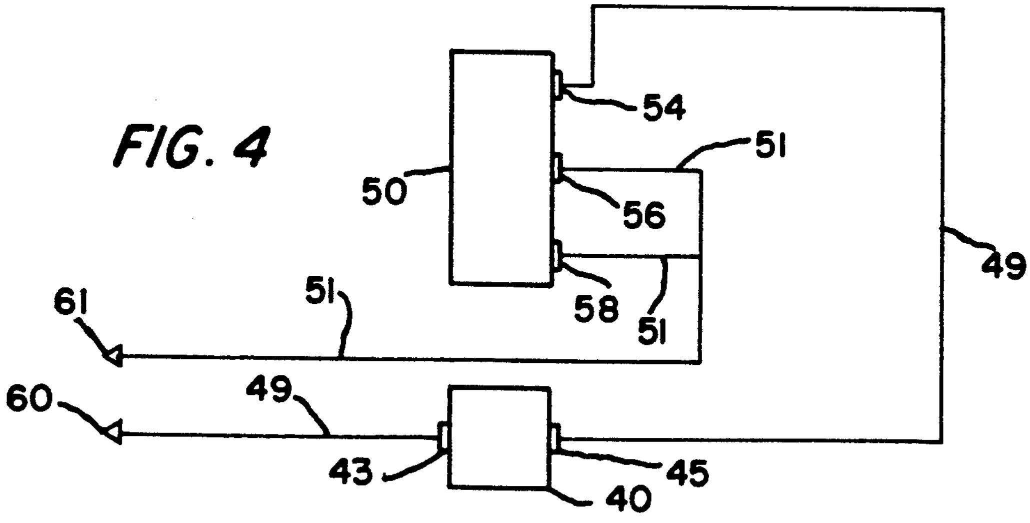

ELECTRICIAN'S FREE POWER CORD

BACKGROUND OF THE INVENTION

1. Field of the Invention

This invention relates to power supply cord to be used by electricians preforming domestic or commercial electric service change or upgrade and more particularly to connection means for temporarily supplying power to circuit breaker and ground fault current interrupter protected circuits.

2. Description of Prior Art

It is generally accepted as common practice to disconnect power from the electrical service that is to be changed or upgraded. This is accomplished by cutting the supply conductors between the street utility pole and the Watt meter in domestic applications. After power has been disconnected there is need for electrical power to operate temporary lights and construction tools such as drills, saws and compressors in the construction area. In order to supply power to these tools it is necessary to connect an extension cord to the supply cable at the point at which it was cut. To accomplish this connection it has been necessary to strip the insulation from the ends of live power lines and mechanically connect the un-insulated ends of the power cable and the extension cord. In most cases this connection is made at a point that is exposed to the elements, in some instances in rain or snow, increasing the hazard to the person making the connection. The tools to be powered usually have a maximum load of 12 amps at 120 volts. The incoming power to most homes is 100 amps minimum at 120 volts on each of two power legs. It is necessary therefore to limit the current delivered by the extension cord to prevent incineration of the tools or the extension cord in the case of a short circuit. Due to the relatively unsafe conditions in most construction areas it has been found advisable to use a ground fault current interrupter to protect workers and equipment from undesired ground fault currents.

Electric plugs with built in fuse devices have been developed as a way to protect appliance cords from overheating due to excessive current flow. U.S. Pat. No. 2,636,096 describes a plug in receptacle. A conventional tubular glass bodied fuse is incorporated into the circuitry. U.S. Pat. No. 2,988,617 and 4,275,374 utilize a similar arrangement with the same type of fuse in an insertion and injection channel, making removal and replacement of the fuse relatively simple. U.S. Pat. No. 5,109,316 provides an extension cord with multiple outlet receptacle receiving power from a conductor connected to a standard electrical plug and fitted with a circuit breaker for protection from over heating due to excessive current flow. The design objectives of each of the above devices is convenience and simplicity of use, however, none of the above designs provide for ground fault current protection for operators or equipment. U.S. Pat. No. 4,567,456 provides a ground fault current interrupter protected extension cord fitted with a standard male electrical plug, but offers no protection from over heating due to excessive current flow.

SUMMERY OF THE INVENTION

The present invention provides a power supply cord with multiple outlet receptacle designed to offer operator and equipment protection when used by electricians performing domestic or commercial electrical change or upgrade, and to offer additional protection to the operator when making temporary connection between the power supply line and the extension cord. Connecting means allows for connection of the extension cord to the power conductors, which can not be be deenergized, without potential of electric shock to the electrician. Accordingly the present invention is directed to a multiple outlet portable extension cord which comprises (a) a molded insulating body having a top face with apertures formed therein to receive circuit breaker reset button and female outlets of ground fault current interrupter mechanism; (b) means for supplying electrical power being attached to the body; (c) a circuit breaker mechanism and a ground fault current interrupter mechanism having multiple electrical outlets mounted in the body and connected in series with one another and with the electrical supply means for respectively protecting external electrical circuits plugged into any of the multiple outlets of the ground fault current interrupter mechanism; (d) a means for connecting power supplying means to power supply line having been severed perpendicular to the axis thereof as well as connecting power supplying means to a Watt meter base.

These and other features and advantages of the present invention will become apparent to those skilled in the art upon reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a detailed view of connecting means of FIG. 1.

FIG. 3 is an exploded view of the connecting means of FIG. 2.

FIG. 4 is a schematic view of the circuit incorporated by the receptacle and connecting means of FIG. 1.

DETAILED DESCRIPTION OF THE INVENTION

Figure 1:
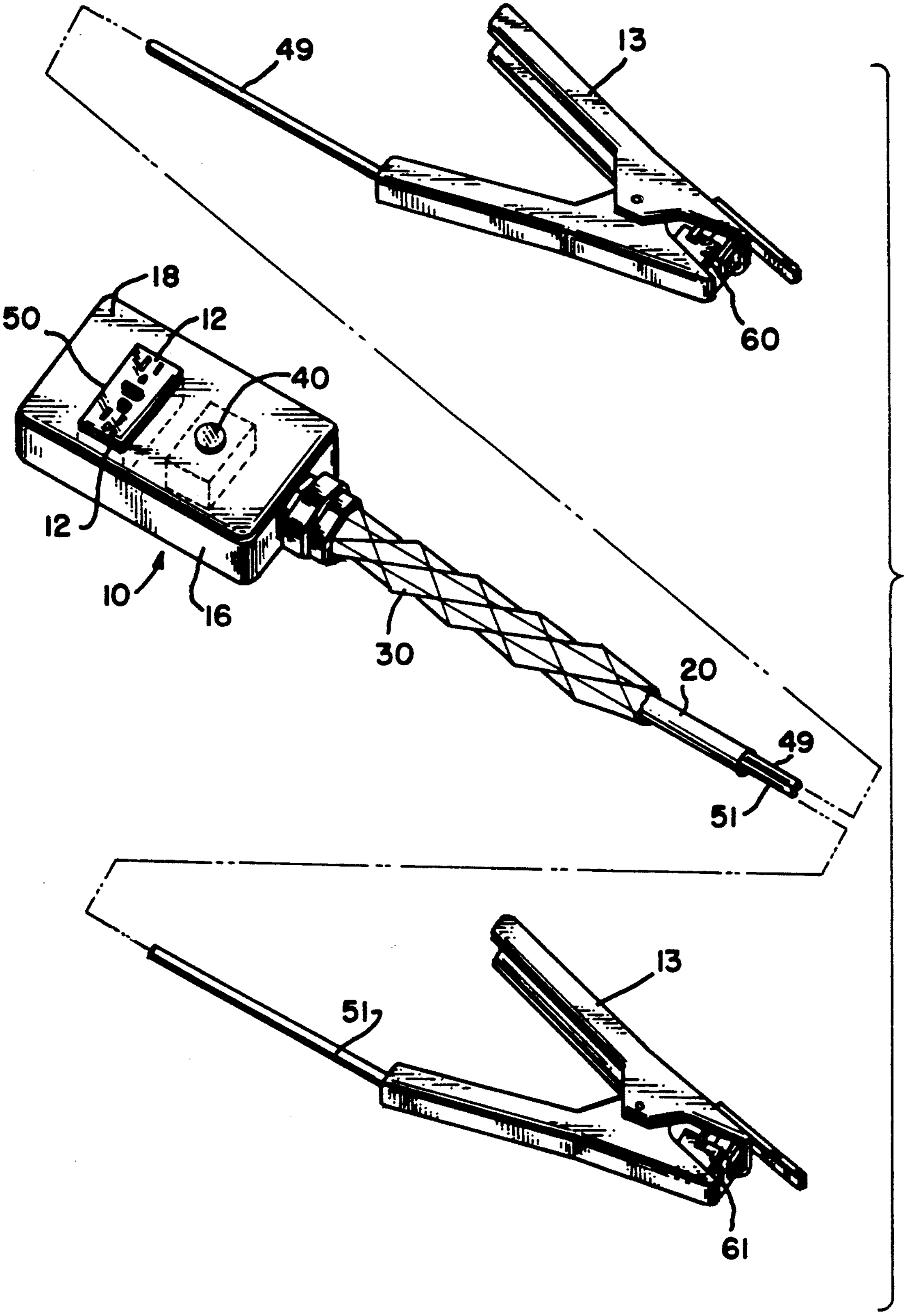
FIG. 1 is a perspective view of a ground fault current interrupter and circuit breaker protected extension cord and connecting means of the present invention.

In the following description like reference characters designate like or corresponding parts throughout the several views of the drawings.

Referring now to the drawings and particularly to FIG. 1 there is illustrated a molded outlet receptacle generally designated 10 including a base 16 and a cover 18. In the illustrated embodiment receptacle 10 is fitted with a ground fault interrupter 50 with two outlets 12. Although two outlets 12 are illustrated, outlets in other numerical arrangements can be provided. In addition to the ground fault current interrupter 50, receptacle 10 is also fitted with a circuit breaker mechanism 40. Means for supplying electrical power, in the form of an electrical power cord 20 is attached to receptacle 10 by a cord grip 30. The electrical power cord 20 includes Two electrical conductors a hot or live conductor 49, and neutral or ground conductor 51. Electrical conductor 49 being connected to electrical connector means 60 and electrical conductor 51 being connected to electrical connector means 61.

Referring now to FIG. 2 the electrical connector means 60 and 61 are identical in construction and vary only in that the coloring of the two clamps should be different to identify the hot connector 60 and the ground or neutral connector 61. Clamp 13 provides a mounting structure for the connecting means 60 and 61 as well as a power line gripping means. Contact holding block 63 composed of a non-conducting material such as nylon or phenolic is attached to clamp 13 by means of mounting screws 64. Contact block 13 includes a through drilled hole 65 to accept contact plunger 66 in sliding contact therewith. Contact block 63 includes a kerf 67 transverse to and intersecting through drilled hole 65 and of sufficient width to accept swivel contact bracket 69 when the clamp 13 is in the closed condition. Contact plunger 66 composed of copper or similar highly conductive material includes a convex spherical contact surface 72 and a cylindrical portion extending through the contact block 63. Contact plunger 66 is biased forward by helical compression spring 75 and is held within contact block 63 by stop 77 which also serves as a means for attaching conductors 49 or 51 to the contact plunger 66. Clamp 13 includes a swivel contact 80 for making electrical contact with a watt meter socket prior to installation of the watt meter. Copper swivel contact 80 is mounted on and and insulated from clamp 13 and is held in conducting contact with swivel bracket 69 by swivel mounting bolt 85.

In operation the operator opens clamp 13 containing connector means 60, presses the severed end of the live power line against the convex spherical contact surface 72 of contact plunger 66 compressing helical compression spring 75. Clamp 13 is then closed to engage the insulating surface of the live power line and maintain electrical contact between the live power line and conductor 49. The operator performs the same operation using clamp containing connecting means 61, connecting the ground or neutral power leg to conductor 51. Since the swivel contact bracket 69 does not contact the contact plunger 66 while the clamp is held partially open by the insulated power line, the entire surface of the clamp 13 is electrically insulated.

After power has been restored to the watt meter socket and prior to installation of the Watt meter, power is supplied to the power supply cord by inserting each of the two swivel blades 80 into the watt meter sockets. The clamp 13 is now in the fully closed condition allowing swivel contact bracket 69 to make electrical contact with contact plunger 66 thereby completing electrical contact between incoming power lines and ground fault current interrupter 50 and circuit breaker 40.

The circuit breaker mechanism 40, the ground fault current interrupter 50, the clamp 13, and the cord grip 30 are conventional components per se. As examples, the circuit breaker mechanism 40 can be a Series-43-400-L10 available from E-T-A Circuit Breakers of Chicago. The ground fault current interrupter can be a Model 6599-I GFI available from Leviton manufacturing of Little Neck N.Y. Clamp 13 can be Clamp model 6202 available from Associated Equipment of St. Louis Mo. Cord grip 30 could be a Kelem Clamp available at most electrical supply houses.

Referring to FIG. 4 connecting means 60 receives power from the live power line or the live watt meter socket and transmits power through the live conductor 49 of the power cord 30 to one terminal 43 of the circuit breaker 40. Terminal 45 of Circuit breaker 40 is connected to hot terminal 54 of ground fault current interrupter 50. Neutral terminal 56 of ground fault current interrupter is connected to connecting means 61 by neutral conductor 51 of power cord 30 and ground terminal 58 of ground fault current interrupter 50 is connected to connecting means 61 by a tap connected to neutral conductor 51. Connecting means 61 is connected to the neutral line of the incoming power supply.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. An electricians power cord, comprising:

(a) a molded insulating body having a bottom wall and a continuous side wall and defining an open top;

(b) means for supplying electrical power being attached to said body, said means including live, ground and/or neutral conductors attached to said body at one end of the respective conductors: and (c) a circuit breaker mechanism and a ground fault current interrupter mechanism having multiple electrical outlets mounted side-by-side one another in said body and connected in series with one another and with said power supplying means for respectively protecting external circuits when plugged into said multiple electrical outlets;

(d) said body also including a cover separate from said base so as to cover said open top thereof, said cover having apertures formed therein to accept the reset button of said circuit breaker mechanism and the multiple electrical outlets of the said ground fault interrupter mechanism;

(e) connecting means attached to the other end of the live conductor of the said power supplying means and similar connecting means attached to the other end of the ground and neutral conductors of the said power supplying means;

(f) each of said connecting means including a battery clamp mechanism with jaws and having a non-conducting contact holding block attached to a clamp portion thereof, the said contact holding block having a through drilled hole in alignment with the centerline of the jaws of the said battery clamp to accept a conducting contact plunger, said contact plunger having a spherical contact surface and a cylindrical body portion extending through the said contact holding block and being biased forward by a helical spring, said contact holding block having a kerf perpendicular to and intersecting the said through drilled hole exposing a portion of the cylindrical body of the said contact plunger, the cylindrical end of the said contact plunger of one of the said connecting means being electrically connected to the live conductor of the said power supplying means and the cylindrical end of the said contact plunger of the other of said connecting means being electrically connected to the ground or neutral conductor of the said power supplying means.

2. The electricians power cord, as recited in claim 1, wherein each of said connecting means includes a swivel contact mechanism having a copper swivel contact blade rotatively mounted on the exterior surface of the jaws of the battery clamp mechanism and electrically insulated from said battery clamp mechanism and being held in electrical contact with a swivel bracket mounted on an interior surface of and extending to, the centerline of the jaws of the said battery clamp mechanism.

* * * * *